United States Patent Office 3,455,828
Patented July 15, 1969

3,455,828
ORGANIC SUSPENDING MEDIUM AND
COMPOSITION
Franklin I. L. Lawrence, Bradford, and Michael J.
Pohorilla, Berwyn, Pa., assignors to Kendall Refining Company, a corporation of Pennsylvania
No Drawing. Continuation-in-part of application Ser. No.
540,159, Oct. 12, 1955. This application Mar. 25, 1966,
Ser. No. 537,284
Int. Cl. C10m 1/10, 1/14
U.S. Cl. 252—31                        15 Claims

ABSTRACT OF THE DISCLOSURE

A composition of matter and a method of incorporating in oleaginous compositions a normally oil-insoluble material stably dispersed in an oxygen-condensed petroleum hydrocarbon resin containing more than 2 naphthenic rings per molecule and not more than 10% of wax hydrocarbon materials and produced by fractionation of heavy petroleum fraction with a liquified normally gaseous hydrocarbon, said resin having an ebullioscopic molecular weight in excess of about 500 and an SUS viscosity at 210° F. of at least about 400 and a bromine number less than 10 and condensed by heating the resin at a temperature of at least 400° F. with free oxygen for a period sufficient to increase the SUS viscosity at 210° F. by at least 200 greater than that of the original resin.

---

This application is a continuation-in-part of application Ser. No. 540,159, filed Oct. 12, 1955, now abandoned.

This invention relates broadly to the incorporation of oil-soluble materials into oleaginous compositions. More particularly, this invention relates to oil-compatible, oxygen-condensed hydrocarbons containing suspended, normally oil-insoluble materials and to oleaginous compositions having said oxygen-condensed hydrocarbons with suspended oil-insoluble materials blended therewith. Additionally, this invention encompasses methods whereby normally oil-insoluble materials may be uniformly dispersed throughout an oil-compatible, oxygen-condensed hydrocarbon suspending medium.

In a vast number of industrial applications, it has been found exceedingly desirable to effect a stable blending of normally oil-insoluble materials in oleaginous compositions. Thus, it is desirable to effect a stable dispersion of a wide variety of organic and inorganic oil-insoluble additives in lubricants to enhance the properties of the lubricant. Alkaline earth carbonates, for example, possess excellent detergent properties and successfully counteract the formation of acids in lubricating compositions. Additionally, such oil-insoluble compounds as boric acid, boric acid esters, ascorbic acid, and the like, are known to impart excellent antioxidant characteristics to lubricants. The limited solubility of these materials in oil, however, has greatly restricted their application as lubricant additives.

In other areas, it is also advantageous to effect a stable blending of oil-insoluble materials with oleaginous compositions. For example, it is desirable to blend oil-insoluble copper anti-fouling compounds with oleaginous marine coating compositions and oil-insoluble anti-fungus and anti-termite materials with other oleaginous coatings. Since it often is necessary to reduce a coating composition to the fluid state with heat or solvents prior to application, it is essential that the oil-insoluble materials remain uniformly distributed throughout the coating composition while the composition is in such fluid or semi-fluid state.

It is an object of the invention to provide oleaginous compositions having normally oil-insoluble materials stably suspended therein.

It is another object of this invention to provide non-corrosive oleaginous compositions having normally oil-insoluble materials stably suspended therein.

It is an additional object of the invention to provide a lubricant which demonstrates high detergency characteristics.

It is a further object of the invention to provide a lubricant having high oxidation stability.

It is a still further object of the invention to provide oleaginous coating compositions having normally oil-insoluble materials stably suspended therein.

It is yet another object of the invention to provide a process whereby oil-insoluble compounds may be incorporated into oxygen-condensed hydrocarbons.

In accordance with this invention, there is provided a composition of matter ideally suited for incorporation into oleaginous compositions which comprises a normally oil-insoluble material stably dispersed in an oil-compatible, oxygen-condensed petroleum hydrocarbon resin produced by contacting a hydrocarbon starting material having an ebullioscopic molecular weight in excess of about 500, while at a temperature of at least 400° F. (preferably about 425° F. to about 575° F.), with a free oxygen-containing gas for a period of time requisite to produce a final condensation product effective, in a concentration of about 10% by weight, to increase the viscosity index of a 60 at 100 SUS standard base oil derived from a paraffinic crude source at least ten viscosity index units more than does a like amount of the hydrocarbon starting material from which said condensation product is produced.

The present invention is bottomed on the discovery that the herein described noncorrosive, substantially oil-compatible, oxygen-condensed hydrocarbons are excellently suited as a suspending medium or vehicle for oil-insoluble materials to effect a stable suspension of the oil-insoluble materials in oleaginous compositions. While the oxygen-condensed hydrocarbons which constitute the vehicle of the present invention are somewhat heterogeneous in character and are not capable of precise identification, it appears that the condensation reaction produces a material which, at least in substantial part, partakes of a microgel structure. It is this microgel structure which seemingly is responsible for the remarkable effectiveness of these compositions as suspending mediums for oil-insoluble materials.

The term "microgel" as referred to herein denotes hydrocarbons condensed to superpolymeric size, each superpolymeric molecule being essentially a small particle of condensate approximately colloidal dimensions. In accordance with this invention, the oil-insoluble materials are colloidally dispersed in the oxygen-condensed microgel suspending medium and the oxygen-condensed suspending medium containing colloidally dispersed oil-insoluble materials then is incorporated into an oleaginous composition. Alternatively, the oxygen-condensed suspending medium may be incorporated into an oleaginous composition and the oil-insoluble material thereafter dispersed in the suspending medium. While the oxygen-condensed microgels of the present invention are oil-compatible, they do not form a true molecular solution with oils, but rather are uniformly suspended throughout the oil as small particles, each particle having approximately colloidal dimensions. Thus the microgels of the present invention, themselves containing colloidally dispersed oil-insoluble materials, effect a uniform distribution of oil-insoluble materials throughout oleaginous base compositions.

The oxygen-condensed microgels of this invention may be employed to incorporate a wide variety of normally oil-insoluble organic and inorganic materials in oleaginous compositions. The oxygen-condensed microgels may be employed to incorporate elemental compounds such as sulfur; metal inorganic salts such as alkaline earth carbonates, alkaline earth chlorides, alkaline earth sulfides; molybdenum sulfides, and the like; solid inorganic acids such as boric acid, and the like, metal organo compounds such as cupric acetate, antimony acetate, boric acid esters, barium carbonate, -n-butyl dithiophosphoric acid complexes, and the like; and normally solid organic compounds such as pentachlorophenol, ascorbic acid, β-naphthylphenylamine, di-β-naphthylamine, phenothiazine, and the like.

The compositions of the present invention may be incorporated into all varieties of oleaginous compositions. They may be employed in oils and greases derived from Pennsylvania crude oil, mid-continent crude oil, asphalt base oils, and all other types of mineral oils as well as synthetic oils including the synthetic ester type oils such as di-2-hexylethyl sebacate and di-2-ethylhexyl adipate, and phosphonate oils, such as dibutyl diphosphonate oils, tetrabutyl tetramethylene diphosphonate, and bis-(2-ethylhexyl) 2-ethylhexyl phosphonate. Additionally, the compositions of the present invention may be incorporated into tar and tar-like coating compositions, as well as compositions generally having an oleaginous base.

The oxygen-condensed resin containing oil-insoluble material may be incorporated into oleaginous-base compositions at ambient temperatures if the oleaginous composition is sufficiently fluid to effect a dispersion of the suspending medium. In the event that the oleaginous-base composition is extremely viscous or solid at ambient temperatures, the compositions of the present invention may be blended with the oleaginous base at elevated temperatures or by the utilization of diluent oils.

The amount of oil-insoluble material to be incorporated into an oleaginous composition will vary depending upon the particular application. In the case of barium carbonate or other antacid compounds in lubricating compositions, it may be desirable to incorporate as much as possible. In the case of fungicides, antioxidants and the like, small quantities, such as .05% or less may accomplish the desired result.

In the interests of orderly presentation, the preparation of the oxygen-condensed microgel first will be described and methods for incorporating the oil-insoluble materials into the suspending medium subsequently will be discussed.

The oxygen-condensed hydrocarbons of this invention are usually characterized by a ring and ball softening point, as measured by A.S.T.M. Method E 28–42T, of more than about 80° F. Some microgels comprehended by the invention have a ring and ball softening point or viscosity too low to be effectively measured in accordance with the aforementioned procedure. Such materials are characterized by a viscosity of at least about 400 SUS at 210° F., preferably at least about 1000 to 5000 SUS at 210° F., and, in any event, a viscosity of at least about 200 SUS at 210° F. greater than the hydrocarbon starting materials from which microgels are produced.

The degree of oxygen condensation contemplated by the present invention most appropriately may be measured by determining the effectiveness of the oxygen-condensed product as a viscosity-index improving agent. Thus, the oxygen-condensed microgel contemplated by the present invention must be effective, in a concentration of about 10% by weight, to increase the viscosity index of a 60 at 100 SUS standard base oil derived from a paraffinic crude source at least ten viscosity index units more than does a like amount of the hydrocarbon starting material from which said condensation product is produced.

The hydrocarbon starting materials which are employed in the production of the microgel suspending medium of the invention must be characterized by an average ebullioscopic molecular weight of at least about 500, preferably at least about 1000. An optimum average ebullioscopic molecular weight range is from about 1200 to 1700. Similarly, the hydrocarbon starting materials employed in preparation of the microgel suspending medium of the invention will be characterized by an SUS viscosity at 210° F. of between about 60 and about 15,000. The preferred materials with a molecular weight of at least about 1000 are further characterized by a viscosity in excess of about 900 SUS at 210° F.

The most appropriate starting materials for the production of the microgels of the invention are suitable crude oil fractions. Appropriate fractions derived from crude oils of any source, including Pennsylvania crude oils, mid-continent crude oils, West Coast crude oils, Canadian crude oils, and the like, can be employed. All types of crude oils, including paraffin base crude oils, asphalt base crude oils, and naphthenic crude oils provide suitable sources from which petroleum fractions useful in the production of the microgels of the invention can be derived.

With respect particularly to fractions derived from Pennsylvania crude oils, it is preferred that the hydrocarbon starting materials from which the microgels of this invention are produced be characterized by a bromine number not in excess of 10. Many of the pure, high-molecular-weight hydrocarbons suitable as starting materials are characterized by a bromine number of 0.

It is additionally preferred that hydrocarbons which are utilized as starting materials for the production of the microgels of the invention contain more than about 2 naphthenic rings per molecule. The rings individually can be integrated with the paraffinic chain portion of the hydrocarbon molecules or condensed with aromatic rings and/or with other naphthenic ring systems. It is also preferred that the hydrocarbon starting materials contain an average of not more than about 50% aromatic carbon atoms. Hydrocarbons which contain an appreciable quantity of highly condensed ring systems, such as those hydrocarbons which are found in the phenol or furfural extracts of lubricating oils, are operable and most appropriately are employed as starting materials for the production of microgels designed for use in synthetic lubricating oil compositions such as the diester oils.

Additionally, it is preferred that the petroleum fractions from which the microgels of the invention are produced contain not more than about 10% of wax-type materials. (The wax content herein referred to is determinable by a procedure similar to that described under A.S.T.M. designation D–721–51T with the exception that methyl isobutyl ketone is employed to precipitate the wax, the sample size is reduced to 0.5 gram, and the determination is conducted at 0° F.) While the starting materials which contain substantially more than 10% by weight of wax as determined by this test (e.g., petrolatum which may reflect a wax content on the order of 40% by weight) can be employed in the production of the microgels of the invention, such materials are not preferred. Such materials best can be used by being blended with more desirable starting materials, such as the preferred petroleum fractions above described, in proportions up to about 25% by weight of the total blend.

Normal or vacuum distillation residual stocks and analogous fractions of paraffin base crude oils, such as Pennsylvania crude oils, are highly appropriate starting materials for the production of the microgels employed in this invention. Hydrocarbons precipitated by conventional propane precipitation processes from such residual stocks are particularly suitable.

Further refinement of such propane-precipitated, high-molecular-weight hydrocarbons, which include both light and heavy resin fractions, by extraction with furfural or phenol in conventional manner, yields a raffinate from which microgels of maximum effectiveness are produced. Conventional solvent extraction processes are utilized to obtain such raffinates. Such processes are well known to the prior art and are described in detail, inter alia, in Industrial and Engineering Chemistry, 40, pages 220–227 (1948), and at pages 335–336 of "Chemical Refining of Petroleum" by V. A. Kalichevsky and B. A. Stagner, Reinhold Publishing Co., 1942. Generally, the degree of extraction should be such as to yield about a 70% to 85% raffinate. More drastic extraction, for example, to yield 50% to 60% raffinates, may be practiced to obtain still more desirable starting materials for the production of the microgels of the invention.

The most preferred starting material for the production of the dispersing mediums of this invention embraces a solvent-extracted Pennsylvania crude oil fraction which has a molecular weight of from about 1200 to about 1700 and a bromine number of not more than about 4, which is substantially wax- and asphalt-free, which contains not more than about 5% by weight of hydrocarbon molecules containing more than 50% aromatic carbon atoms, and which consists primarily of hydrocarbon molecules containing an average of from about 2 to about 7 naphthenic rings.

The microgels of the present invention are produced by contacting an appropriate hydrocarbon starting material, while at a temperature of at least about 400° F., preferably from about 425° F. to about 575° F., with a free oxygen-containing gas for a time requisite to produce the final condensation product having a viscosity of at least 200 SUS at 210° F. greater than the original starting material.

There can be employed in the condensation process by which the dispersing mediums of this invention are produced, any free oxygen-containing gas. Air is preferred for obvious economic reasons. Substantially pure gaseous oxygen can be employed as well as gaseous oxygen combined with inert diluents such as carbon dioxide, nitrogen and the like. Reactive materials such as chlorine, hydrogen chloride, phosphorus pentoxide, and like materials, which serve as activators, appropriately may be introduced into the reaction mixture in conjunction with the free oxygen-containing gas. Conventional catalysts known to the art may be employed, if desired.

The rate of supply of free oxygen to the reaction mixture is not a critical aspect of this invention. In general, free oxygen-containing gas is passed through the reaction mixture at a rate sufficient to provide at least about 10 cu. ft. of free oxygen per gallon of hydrocarbon material per hour. Preferably, free oxygen is supplied to the reaction mixture at a rate of from about 11 cu. ft. to about 27 cu. ft. per gallon of hydrocarbon per hour. The corresponding air rates are at least about 50 cu. ft. to about 135 cu. ft. per gallon of hydrocarbon per hour. Normally the condensation reaction is completed in about 3 hours. The time required for the reaction is a function of the temperature at which the process is carried out, the ring and ball softening point desired in the final condensation product, and more particularly the rate at which the heat of reaction can be dissipated. The reaction time alone does not constitute a critical aspect of this invention.

For some applications, it may be desired further to enhance the resistance to oxidation or otherwise improve the condensation products which are employed in the invention. Such modifications effected, inter alia, through chemical modification of the hydrocarbonaceous condensation products, hereinafter described, produce nonequivalent materials. More specifically, the oxidation resistance of such condensation products is increased by further chemical treatment to neutralize reactive groups and/or simultaneously build antioxidant properties into the molecular structure.

Polyalkylene polyamines derived from ethylene diamine, such as diethylene triamine, triethylene tetramine, tetraethylene pentamine; aromatic amines such as diphenylamine and o-phenylenediamine; ammonia, and the like, or mixtures thereof, are also suitable modifying agents for the otherwise unmodified hydrocarbonaceous condensation products of the invention. Elemental sulfur is likewise a suitable modifying agent for the dispersing medium of this invention.

Additionally, the various isocyanates which correspond to the following formula:

(I) $$R(N\!\!=\!\!C\!\!=\!\!O)_n$$

in which R is an alkyl group containing from 1 to 10 carbon atoms, and $n$ is any integer from 1 to 3 inclusive, can be employed to modify the oxygen condensation products of the invention. Typical alkyl groups which are represented by R include methyl, ethyl, propyl, isopropyl, butyl, isobutyl, hexyl, octyl, decyl, and the like. R may also be aryl, including tolyl, phenyl, diphenyl methane, alpha-naphthyl, and the like, in the foregoing isocyanate formulae.

As illustrated in the examples, the aforementioned inorganic and organic reagents are utilized, alone or in combination, by heating a mixture of the condensation product and the selected reagent or reagents at an appropriate temperature for a short period of time. In general, at least about 0.25% by weight, preferably about 0.25% to about 5.0% by weight of the organic or inorganic reagents, or mixtures thereof, are employed, based on the weight of the condensation product. Such quantities generally afford an excess of the reagent, which is not objectionable. The temperature and time of the reaction are not critical. A temperature of from about 175° F. to about 500° F. and a reaction time of at least about 20 minutes, preferably from about 20 to 120 minutes, can be observed with satisfactory results. The reaction may be conducted under an inert atmosphere, if desired. In the case of certain of the organic reagents, temperatures must be controlled to prevent decomposition. A preferred procedure is to convert the hydrocarbon fraction employed as a starting material to an oxygen condensation product having a ring and ball softening point somewhat below, for example, 10 to 20° below the softening point desired in the final product, followed by reaction with the above-described reagents to an extent requisite to raise the ring and ball softening point to the ultimately desired value.

Additionally, the hydrocarbon starting material initially may be condensed with oxygen to produce an intermediate product which is further reacted with phosphorus pentasulfide, the phosphorus pentasulfide reaction product being finished by condensation with additional sulfur to produce a final product of the desired ring and ball softening point. More particularly, there may be employed in such processes up to about 5% by weight, based on the hydrocarbon, of phosphorus pentasulfide. Other phosphorus sulfides, such as phosphorus sesquisulfide and the like, may be employed in a similar fashion.

Inasmuch as many condensation products contemplated by the invention are readily workable only at relatively high temperatures, i.e., 350° to 450° F., an alternative method for modifying such products is advantageously employed when reagents are utilized which may be unstable at such high temperatures. Such alternative procedure embraces first blending the condensation product which is to be modified, with an appropriate base stock in suitable proportions, followed by the addition of the desired quantity of reagent. More specifically, the condensation products may be mixed in proportions from about 20% to 50% by weight with, for example, the ultimate base stock in which they are to be utilized. To the mixture so obtained, there is then added from about 1 to about 5% by weight of the desired reagents, based upon the condensation product, preferably in small proportions. This addition may be effected under an inert atmosphere, if desired. The desired reaction is then effected at a temperature of from about 175° F. to 275° F. The ultimate product so obtained is then admixed in appropriate concentration with additional quantities of the base stock employed. This procedure is particularly applicable in the modification of the condensation product through utilization of such reagents as the isocyanates and amines, as above defined.

The condensation products produced in the above-described manner not only constitute excellent suspending mediums for oil-insoluble materials in oleaginous compositions, but additionally exhibit marked viscosity index improving characteristics. Thus when the compositions of the present invention are incroporated into lubricants, power transmission fluids, shock absorber fluids and the like, the viscosity index and detergency or the viscosity index and oxidation stability of the base composition simultaneously may be enhanced. Moreover, oil-insoluble antioxidants may be incorporated into the oxygen-condensed hydrocarbon to enhance its own resistance to oxidation and thereby permit its utilization as a viscosity index improving agent in very high temperature service.

The method which most appropriately may be employed to incorporate the oil-insoluble material into the oxygen-condensed microgel will vary somewhat depending upon the characteristics of the oil-insoluble material to be dispersed. However, the oil-insoluble material is preferably incorporated into the oxygen condensed microgel before the microgel is added to a base oil. In any event to make a stable dispersion of the oil-insoluble material the oxygen condensed microgel should be at a concentration of at least 20% in the base oil.

In the event that the material to be dispersed in the oxygen-condensed microgel has a melting point not in excess of about 600° F., the oil-insoluble material may be heated to the liquid state and thoroughly admixed with heated oxygen-condensed microgel. Upon cooling, the normally oil-insoluble material will be finely dispersed throughout the oxygen-condensed microgel. Sulfur, for example, may be heated to the fluid state and blended with the oxygen-condensed hydrocarbon.

If the material to be dispersed in the oxygen-condensed microgel is soluble in a solvent which is oil-miscible, the oil-insoluble material may be dissolved in the solvent, thoroughly blended with the microgel, and thereafter the mixture may be heated to release the solvent. Copper acetate, for example, may be dissolved with acetic acid and blended with the oxygen-condensed microgel. Subsequent heating to 400–450° F. releases the acetic acid and leaves minute particles of cupric acetate suspended throughout the microgel.

It was attempted to produce an additive by substituting the non-acidic condensed hydrocarbon of the present invention for the acidic organic compound of the above-described prior art process. Inoperable gels were obtained which could not be filtered and which would not disperse in oil as compared with the readily filtrable, readily dispersible microgels of the invention.

The following examples are presented for purposes of more specific illustration of the compositions and processes of the invention. It is not intended that the scope of the invention be limited by the specific embodiments described.

(A) Preparation of oxygen-condensed microgel

EXAMPLE I

Separation from cylinder stock of viscous hydrocarbons for use in the preparation of dispersing mediums About 75,000 grams of a cylinder stock derived by distillation from paraffin-base Pennsylvania crude oil and characterized by a boiling point in excess of about 850° F., a molecular weight of about 750, a viscosity at 210° F. of 225 SUS, an A.P.I. gravity of about 24.8, and a flash point (Cleveland Open Cup) of about 600° F., were mixed with propane, heated to a temperature of about 190° F. and then cooled to a temperature of about 65° F. The cylinder stock-propane solution thereafter was transferred into a chilling tank wherein the pressure was reduced to an extent requisite to volatilize sufficient propane to lower the temperature of the solution from about −20° F. to about −50° F. Makeup propane was added during the chilling operation, such that the ratio of propane to cylinder stock was about 3 to 1 at the end of the chilling cycle. During the chilling cycle, petrolatum was precipitated from the solution. The chilled cylinder stock-propane solution containing precipitated petrolatum was transferred to a filter feed tank and thence passed through an appropriate filter to effect removal of the petrolatum from the chilled solution.

Propane was added to the filtrate in an amount sufficient to raise the propane-cylinder stock ratio to about 10 to 1 and the temperature of the solution so obtained was elevated to about 150° F. to 180° F. whereupon about 15,000 grams of high molecular weight viscous materials were precipitated. The viscous materials still contained some propane.

The material so obtained was mixed at a temperature of about 130° F. to 135° F. with additional propane to increase the propane-oil ratio to about 20 to 1. The temperature of the resulting solution was lowered to about 100° F. whereupon about 6,000 grams of viscous hydrocarbons were precipitated. These materials, after removal of all residual propane, are designated as heavy resins and are characterized by a molecular weight of about 1400, a viscosity of about 4100 SUS at 210° F., and a bromine number of 3.7.

The remaining oil-propane solution was heated to about 150° F. whereupon 9,000 grams of additional viscous hydrocarbons which are designated as light resins, were precipitated. Any residual propane was removed in a flash chamber. These hydrocarbons are characterized by a molecular weight of about 1300, a viscosity of about 1150 SUS at 210° F., and a bromine number of about 4.0.

Oxygen condensation

About 9,000 grams of the viscous materials separated from the cylinder stock, in the manner above described and designated as light resin, and 1,000 grams of bright stock were charged to suitable apparatus and initially heated to a temperature of 500° F. Air was passed through the mixture at a rate of about 60 cu. ft./gal./hr. Air was added continuously for approximately six hours at a temperature of approximately 500° F. to produce a final product characterized by a ring and ball softening point of about 145° F. The bright stock referred to was a fraction of Pennsylvania paraffin-base crude oil having a boiling point range greater than about 350° F., a viscosity of about 150 SUS at 210° F. and obtained by solvent dewaxing and deresining of cylinder stock.

EXAMPLE II

A microgel was prepared in a manner identical to Example I with the exception that the condensation process was terminated when the product was characteriezd by a ring and ball softening point of about 200° F.

EXAMPLE III

The process of Example I was repeated but in this instance the condensation process was stopped at a point requisite to produce a microgel having a ring and ball softening point of about 286° F.

EXAMPLE IV

The process of Example I was repeated but in this instance air was passed through the mixture for approximately 8 hours to produce a final product characterized by a ring and ball softening point of about 250° F.

When 10% of the condensed hydrocarbon was blended with a neutral oil having a viscosity of 60 SUS at 100° F. derived from Pennsylvania paraffin-base crude oil by redistillation of a wide boiling primary distillate which had undergone chilling to remove wax, the viscosity index of the oil was improved from 88.7 to 165.6.

EXAMPLE V

The process of Example I was repeated except that the condensation process was stopped at a point requisite to produce a microgel having a ring and ball softening point of about 130° F.

When 10% of this condensed hydrocarbon material was blended with the neutral oil fraction described in Example IV, the viscosity index of the oil was increased from 88.7 to 152.1.

EXAMPLE VI

The process of Example I was repeated except that the condensation process was stopped at a point requisite to produce a microgel having a ring and ball softening point of about 160° F.

When 10% of this condensed hydrocarbon material was blended with the neutral oil fraction described in Example IV, the viscosity index of the oil was increased from 88.7 to 156.5.

EXAMPLE VII

The process of Example I was repeated except that the condensation process was stopped at a point requisite to produce a microgel having a ring and ball softening point of about 190° F.

When 8% of this condensed hydrocarbon material was blended with the neutral oil fraction described in Example IV, the viscosity index of the oil was increased from 88.7 to 159.3.

EXAMPLE VIII

The process of Example I was repeated except that the condensation process was stopped at a point requisite to produce a microgel having a ring and ball softening point of about 220° F.

When 7% of this condensed hydrocarbon material was blended with the neutral oil fraction described in Example IV, the viscosity index of the oil was increased from 88.7 to 164.3.

EXAMPLE IX

The process of Example I was repeated except that the condensation process was stopped at a point requisite to produce a microgel having a ring and ball softening point of about 270° F.

When 7% of this condensed hydrocarbon material was blended with the neutral oil fraction described in Example IV, the viscosity index of the oil was increased from 88.7 to 162.7.

EXAMPLE X

An oxygen-condensed microgel was prepared from a fraction of Pennsylvania paraffin-base crude oil designated as heavy resin described in Example I, which had been further processed by solvent extracting with phenol to a 65% raffinate yield.

The material above described was characterized by an average molecular weight of about 1680, a viscosity of about 1550 SUS at 210° F., a bromine number of 1.2, and was substantially wax- and asphalt-free. This material was heated to a temperature of about 475° F. and air added continuously while the reaction mixture was maintained within a temperature range of 450–500° F. for a time requisite to produce a product having a ring and ball softening point of about 154° F.

EXAMPLE XI

Example X was repeated with the exception that the condensation reaction was continued to produce a product having a ring and ball softening point of about 250° F.

EXAMPLE XII

Example X was repeated with the exception that the condensation reaction was continued to produce a product having a ring and ball softening point of about 270° F.

EXAMPLE XIII

The process of Example X was repeated with the exception that the condensation reaction was continued for a time requisite to produce a product having a ring and ball softening point of about 245° F.

When 10% of this oxygen-condensed hydrocarbon material was blended with the neutral oil described in Example IV, the viscosity index of the oil was increased from 88.7 to 159.9.

EXAMPLE XIV

Oxygen-condensed microgels were prepared with the variations of starting materials and ring and ball softening points in the final condensation products as indicated in Table 1.

TABLE 1

| Oxygen-condensed materials | Ring and ball softening point, °F. | V.I. of blend in 60/100 neutral 4% | 10% |
|---|---|---|---|
| Heavy resin [1] |  |  | 115.7 |
|  | 89 |  | 131.2 |
|  | 260 | 140.9 |  |
| Light resin [2] |  |  | 115.8 |
|  | 69 |  | 133.0 |
|  | 254 | 156.2 |  |
| Solvent refined paraffin base bright stock.[3] |  |  | 105.2 |
|  | 266 |  | 125.0 |
|  | 264 | 145.0 |  |
| Solvent extracted mixed base bright stock.[4] |  |  | 96.6 |
|  | 254 | 135.3 |  |
| Light resin, 85% raffinate [5] |  |  | 124.0 |
|  | 80 |  | 140.6 |
|  | 258 | 166.3 |  |

[1] The heavy resin derived from Pennsylvania base crude oil and described in Example I.
[2] Light resin derived from Pennsylvania base crude as described under Example I and characterized by a viscosity at 210° F. of 1210 SUS and an average molecular weight of about 1110.
[3] Solvent refined paraffin base bright stock derived by propane dewaxing of Pennsylvania crude residual cylinder stock and phenol extraction to a 92.0% raffinate yield. This stock is characterized by a viscosity at 210° F. of about 140 SUS, a viscosity index of about 102, a flash point of about 550° F. and a pour point of +15° F.
[4] Solvent extracted mixed base bright stock prepared by solvent treatment of a Mid-continent base crude residuum and characterized by a viscosity of 152.8 SUS at 210° F., a bromine number of 2.4, and a molecular weight of about 770.
[5] The light resin described above but phenol extracted to an 85% raffinate yield and characterized by a viscosity at 210° F. of about 915 SUS and an average molecular weight of about 1350.

EXAMPLE XV

About 100 parts by weight of a bright stock extract, which is a fraction of Pennsylvania crude oil removed from Pennsylvania bright stock by phenol extraction, was employed as the starting materials for the production of the oxygen condensation product useful as a suspending medium in accordance with the invention. The bright stock extract employed was characterized by the following physical properties:

Gravity _____ 10.4° API.
Viscosity at 100° F. _____ 840,000 SUS.
Viscosity at 210° F. _____ 1210 SUS.
Viscosity Index _____ −173.

The bright stock extract was condensed with oxygen under the conditions corresponding to those described in Example I to produce a final product having a ring and ball softening point of about 248° F.

EXAMPLE XVI

The process of Example X was repeated with the exception that in this instance there was employed in lieu of the starting material described in Example X a bright stock raffinate produced as follows and having the following properties:

The bright stock referred to in Example I was extracted with phenol to a 92% raffinate yield and was characterized by a viscosity of about 140 SUS at 210° F., a bromine number of 7.1 and a molecular weight of about 690.

The neutral oil of Example IV containing 10% of the oxygen-condensed raffinate exhibited a viscosity index of 157.3.

EXAMPLE XVII

The process of Example X was repeated with the exception that in this instance petrolatum resin was employed as a starting material. The petrolatum resin was obtained by treating the petrolatum described in Example I with propane so that the propane:oil ratio was approximately 10:1, and heating the resulting mixture to about 135–160° F. Petrolatum resin which was thereby precipitated from the solution was characterized by a viscosity of about 2800 SUS at 210° F., a gravity of about 18.6 API and a wax content of about 40%. The 60 at 100 neutral oil described in Example IV containing 10% of the condensed resin exhibited a viscosity index of 152.9.

EXAMPLE XVIII

The process of Example I was repeated with the exception that in this instance the reaction mixture was maintained at a temperature of 425° F. during the blowing operation. A product having a ring and ball softening point of about 250° F. was obtained after about 15 hours. The product was analogous in other respects to the product of Example I.

EXAMPLE XIX

The process of Example I was repeated with the exception that in this instance the reaction mixture was maintained at a temperature of 575° F. during the blowing operation. A product having a ring and ball softening point of about 250° F. was obtained after about 5 hours. The product was analogous in other respects to the product of Example I.

EXAMPLE XX

The process of Example I was repeated with the variations of starting material and ring and ball softening points of the final condensation products as indicated in Table 2. The effectiveness of these condensed hydrocarbons when blended with the 60 and 100 neutral oil described in Example IV is reflected by the data which appears in Table 2.

TABLE 2

| Air blown materials | Ring and ball softening point of V.I.I., ° F. | Percent V.I.I. in blend | V.I. |
|---|---|---|---|
| Bright stock, 83.5% raffinate (zero pour) [1] | 242 | 10 | 159.6 |
| Solvent extracted mixed base bright stock [2] | 241 | 10 | 159.9 |
| Light resin, 58% raffinate [3] | 188 | 5 | 168.4 |
|  | 228 | 5 | 169.1 |
|  | 270 | 4 | 174.8 |
| Heavy resin, 65% raffinate [4] | 205 | 7 | 164.9 |
|  | 245 | 5 | 170.7 |
|  | 255 | 4 | 172.0 |
|  | 278 | 5 | 171.1 |
| Heavy resin, 44% raffinate (Extraction 307) [5] | 236 | 5 | 168.6 |
|  | 281 | 6 | 166.6 |
|  | 341 | 5 | 165.9 |

[1] The bright stock, 83.5% raffinate (zero pour), is derived by propane dewaxing of Pennsylvania crude residual cylinder stock followed by phenol extraction to an 83.5% raffinate yield. This stock is characterized by a viscosity of 140 SUS at 210° F., a molecular weight of about 740, and a bromine number of about 7.0.

[2] Solvent extracted mixed base bright stock is prepared by solvent treatment of a mid-continent base crude residuum and is characterized by a viscosity of 152.8 SUS at 210° F., a bromine number of 2.4, and a molecular weight of about 770.

[3] The light resin, 58% raffinate, is obtained by phenol extraction of the light resins described under Example I and is characterized by a molecular weight of about 1490, a viscosity of 807.2 SUS at 210° F., and a bromine number of about 1.5.

[4] The heavy resin, 65% raffinate, is prepared by phenol extraction of the heavy resin described under Example I to a 65% raffinate yield and is characterized by a molecular weight of about 1680, and a bromine number of about 1.2, and a viscosity of 1575 SUS at 210° F.

[5] The heavy resin, 44% raffinate, is prepared by phenol extraction of the heavy resin described under Example I and is characterized by a molecular weight of about 1,570, a viscosity of about 1,645 SUS at 210° F., and a bromine number of about 1.5.

EXAMPLE XXI

The process of Example I was repeated to produce a condensed hydrocarbon having a ring and ball softening point of 230° F. The product so produced was then admixed with about 0.5% by weight of flowers of sulfur and heated under an atmosphere of nitrogen for a period of about 2 hours at a temperature of about 500° F.

A dewaxed paraffin base oil fraction derived from Pennsylvania crude oil and characterized by a viscosity at 100° F. of about 60 SUS containing 10% of the condensed hydrocarbon exhibited a viscosity index of 157.6. The viscosity index of the base oil was 88.7.

EXAMPLE XXII

The process of Example I was repeated with the exception that the blowing was terminated at a point requisite to produce a material characterized by a ring and ball softening point of about 217° F. The temperature of the product was lowered in the final stages of the blowing process from about 500° F. to about 400° F. and the blowing then was discontinued. Fifty grams of flowers of sulfur were then added and the mixture agitated with nitrogen while maintained at a temperature of about 400° F. for a period of about 2 hours to obtain a final end product having a ring and ball softening point of about 277° F. and a sulfur content of about 0.13% by weight.

EXAMPLE XXIII

The process of Example I was repeated to produce an oxygen-condensed hydrocarbon having a ring and ball softening point of 220° F. The product so obtained was then admixed with sufficient $P_2S_5$ under an atmosphere of nitrogen and heated for a period of about 2 hours at a temperature of about 500° F. to produce an ultimate product characterized by a ring and ball softening point of about 250° F.

The oil described in Example XXI containing 10% of this consensed hydrocarbon exhibited a viscosity index of 154.2.

EXAMPLE XXIV

The procedure of Example XXIII was repeated with the exception that the blowing process was stopped at the time the condenstation product was characterized by a ring and ball softening point of about 237° F. Sufficient $P_2S_5$ was introduced into the condensation product while at a temperature of about 240° F. and these reactants were maintained at this temperature for about 120 minutes to obtain an ultimate product characterized by a ring and ball softening point of 249° F.

EXAMPLE XXV

The process of Example I was repeated with the exception that the blowing process was stopped at a point requisite to produce a product having a ring and ball softening point of about 120° F. The product so produced was then treated at a temperature of 500° F. with 1% by weight thereof of phosphorus pentasulfide added in four ¼ increments, each increment every fifteen minutes. The phosphorus pentasulfide modified product was characterized by a ring and ball softening point of 184° F. This produce was further treated at 500° F. with about 3⅜% by weight, based on the original blown product prior to treatment with phosphorus pentasulfide, of elemental sulfur added in small increments over a period of approximately five hours to produce a final product characterized by a ring and ball softening point of 242° F. and containing 0.19% by weight of phosphorus and 1.34% by weight of sulfur.

The 60 at 100 neutral oil described in Example IV containing 4% by weight of this modified condensation product exhibited a viscosity index of 136.7.

EXAMPLE XXVI

A light resin raffinate obtained by phenol extraction of the light resins described in Example I to an 85% raffinate and characterized by an ebullioscopic weight of about 1350 and a viscosity at 210° F. of about 916 SUS was oxygen-condensed in a manner similar to that described in Example I to a ring and ball softening point of about 188°

F. The oxygen-condensed raffinate was reacted at a temperature of about 400° F. for a period of about one hour with about ½% of a mixture of polyalkylene polyamines which was predominantly diethylene triamine and triethylene tetramine. The ring and ball softening point of the reaction product was 220° F.

EXAMPLE XXVII

Example XXVI was repeated with the exception that the light resin raffinate oxygen-condensed microgel had a ring and ball softening point of about 216° F. Such product was treated with about 2% by weight of diphenylamine under the same conditions and in the same manner as described in Example XXVI.

EXAMPLE XXVIII

A light resin raffinate oxygen-condensed microgel of the type described in Example XXVI but having a ring and ball softening point of about 249° F. was reacted with ammonia gas for a period of about one hour at a temperature of 500° F. Gaseous ammonia was passed through the reaction mixture at the rate of about 8 liters per hour. The reaction product had a ring and ball softening point of about 260° F. and contained 0.8% chemically combined nitrogen.

EXAMPLE XXIX

Approximately 5,670 grams of 90% light resin, as described in Example I, were blended with 10% bright stock raffinate described in footnote "1" of Table 2, and were air-blown at a temperature of about 500° F. to a ring and ball softening point of about 200° F. The product was lowered to a temperature of about 430° F., at which time about 383.5 grams of elemental sulfur were added. After a reaction time of about four hours, the ring and ball softening point of the product was about 290° F. and the product contained about 1.63% sulfur. To about 5,200 grams of this product there were added 244 grams of diphenylamine while the reaction mixture was held at a temperature of about 400–450° F. for two hours.

The final product exhibited a ring and ball softening point of 293° F.

EXAMPLE XXX

Three thousand eight hundred and sixty grams of the mixture of light resin and bright stock raffinate described in Example XXIX were air-blown at a temperature of about 500° F. to a ring and ball softening point of about 190° F. At this point there was added 10% by weight of a mixture of polyalkylene polyamines consisting predominantly of diethylene triamine and triethylene tetramine. The temperature of the reaction mixture was maintained at 400° F. for a period of two hours, following which the product was stripped of volatile light ends by bubbling nitrogen vigorously therethrough.

EXAMPLE XXXI

The process of Example I was repeated with the exception that the blowing process was terminated at a point requisite to provide a condensation product having a ring and ball softening point of 180–200° F. 311.8 grams of the condensation product so obtained were heated to a temperature of about 400° F. and 0.78 gram of tolylene diisocyanate were added. The temperature of the mixture was maintained at 400° F. with agitation for about 20 minutes, during which time the reaction mixture thickened. The product so obtained was characterized by a ring and ball softening point of about 245° F. This material, when blended in the proportion of about 10% by weight with the 60 SUS at 100° F. neutral oil described in Example IV, raised the viscosity index of the oil from 88.7 to 163.0.

(B) Incorporation of oil-insoluble material into the oxygen-condensed hydrocarbons

EXAMPLE XXXII

The product of Example II was heated to a temperature of about 400° F. and 30% by weight of pentachlorophenol was dissolved in the molten oxygen-condensed hydrocarbon. Upon cooling, the pentachlorophenol was uniformly and stably dispersed throughout the oxygen-condensed hydrocarbon.

EXAMPLE XXXIII

The product of Example II was heated to a temperature of approximately 460° F. and 1% boric acid was added to the molten oxygen-condensed hydrocarbon. Upon cooling, the boric acid was finely distributed throughout the oxygen-condensed hydrocarbon in a stable dispersion.

EXAMPLE XXXIV

An oxygen-condensed light resin raffinate having a ring and ball softening point of 195° F. was heated to 375° F. and 3% by weight of molybdenum disulfide was added with stirring to the molten oxidized hydrocarbon. The molybdenum disulfide was stably dispersed in the condensate.

EXAMPLE XXXV

Cupric acetate in an acetic acid solution was added to the product of Example II in an amount approximating 0.5% of the weight of the oxygen-condensed hydrocarbon. After heating the mixture to approximately 400° F. to release the acetic acid, the product was cooled and found to contain finely divided cupric acetate in stable dispersion.

EXAMPLE XXXVI

About 83.8 parts by weight of the condensation product described in Example IV was heated to a temperature of about 300° F. and about 16.2 parts by weight of phenothiazine having the following formula was incorporated into the oxygen-condensed hydrocarbon by mixing:

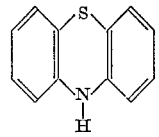

The product so produced was cooled and when blended with a base oil demonstrated marked resistance to oxidation. The phenothiazine was stably dispersed in the oxygen-condensed hydrocarbon.

EXAMPLE XXXVII

Four hundred grams of the oxygen-condensed hydrocarbon of Example IV were mixed with 66.8 grams of β-naphthylphenylamine with agitation and at a temperature of about 450° F. The imine was stably dispersed within the oxygenated hydrocarbon condensation product.

EXAMPLE XXXVIII

A microgel was prepared in a manner identical to Example I with the exception that the condensation process was chemically combined sulfur. The product when ring and ball softening point of about 183° F. The temperature was lowered to about 300° F., and there was then added incrementally over a period of about one hour approximately 4% elemental sulfur. The ring and ball softening point after this period of time remained essentially unchanged at about 178° F. The product contained about 4.27% sulfur, of which only about 0.3% was chemically combined sulfur. The product when added in an amount of about 20% by weight to medium neutral raffinate produced a stable dispersion.

EXAMPLE XXXIX

An oxygen condensed microgel of the type described in Example I was prepared with the exception that in place of the 1000 grams of bright stock, 1000 grams of high phenyl containing silicone, Dow Corning 710, was used. The silicone was not added until two hours before the resin was condensed to the 145° F. ring and ball stage. The product with a ring and ball softening point of 145° F. was dispersed in a light paraffinic neutral oil to a concentration of 0.5% of the silicone in the neutral oil. The dispersion was observed for three months without there being any evidence of separation of the silicone from the neutral oil as would ordinarily be the case in the absence of the oxygen condensed microgels. The silicone was stably dispersed in the microgels.

EXAMPLE XXXX

The process of Example I was repeated. The oxygen condensed resin was placed in a Baker Perkins mixer and 5% by weight of a perfluoro carbon ($C_8F_{16}O$) was added. The two components were mixed for one hour. Then this product was mixed further for ½ hour with a 100 SUS @ 100 neutral oil in the ratio of 1 to 1. Finally using ordinary mixing techniques the oxygen condensed resin was diluted to a concentration of 10% in the 100 @ 100 neutral. After two weeks observation, there was no settling of the perfluoro compound. The conclusion being that the perfluoro compound was stably dispersed in the microgel; whereas, it has only limited solubility in the light neutral oil.

Since modifications of the invention will be apparent to those skilled in the art, the invention is intended to be limited only by the scope of the appended claims.

We claim:
1. A composition of matter for incorporation in oleaginous compositions consisting essentially of a normally oil-insoluble material stably dispersed in an oxygen-condensed petroleum hydrocarbon resin containing more than 2 naphthenic rings per molecule and not more than 10% of wax hydrocarbon materials and produced by fractionation of heavy petroleum fraction with a liquified normally gaseous hydrocarbon, said resin having an ebullioscopic molecular weight in excess of about 500 and an SUS viscosity at 210° F. of at least about 400 and a bromine number less than 10 and condensed by heating said resin at a temperature of at least 400° F. with free oxygen for a period sufficient to increase the SUS viscosity at 210° F. by at least 200 greater than that of the original resin, said oxygen condensed hydrocarbon being effective in a concentration of about 10% by weight to increase the viscosity index of a 60 at 100 SUS standard base oil derived from a paraffinic crude source at least ten viscosity index units more than does a like amount of the hydrocarbon starting material from which said condensation product is produced.

2. The composition of claim 1 wherein the dispersed oil-insoluble material is in the solid state.

3. The composition of claim 2 wherein the dispersed material is sulfur.

4. The composition of claim 1 wherein the dispersed oil-insoluble material is a normally solid inorganic acid.

5. The composition of claim 1 wherein the dispersed oil-insoluble material is a solid organo-metal compound.

6. The composition of claim 1 wherein the dispersed oil-insoluble material is a solid organic compound.

7. The composition of claim 1 wherein the dispersed oil-insoluble material is an inorganic metal salt.

8. The composition of claim 1 wherein the dispersed oil-insoluble material is a silicone.

9. A composition of matter as claimed in claim 1 wherein the starting petroleum resin which is condensed with oxygen is a solvent-extracted Pennsylvania crude oil fraction which is substantially wax and asphalt free having a molecular weight of from about 1200 to 1700, a bromine number of not more than about 4, containing not more than 5% by weight of hydrocarbon molecules containing more than 50% aromatic carbon atoms and consisting primarily of hydrocarbon molecules containing an average of from about 2 to about 7 naphthenic rings.

10. A composition as claimed in claim 1 wherein the starting resin has an ebullioscopic molecular weight between about 1200 to about 1700.

11. A composition as claimed in claim 1 wherein the starting resin has an ebullioscopic molecular weight in excess of 1000 and an SUS viscosity at 210° F. of at least about 400.

12. The composition of claim 1 wherein the oxygen condensed hydrocarbon has been further contacted with a phosphorus sulfide.

13. The method of stably dispersing a normally oil insoluble material in an oleaginous composition comprising the steps of suspending said normally oil insoluble material in an oxygen condensed petroleum hydrocarbon resin by mixing said oil insoluble material and resin, said resin having an ebullioscopic molecular weight in excess of about 500 and an SUS viscosity at 210° F. of at least about 400 and a bromine number less than 10 and condensed by heating said resin at a temperature of at least 400° F. with free oxygen for a period sufficient to increase the SUS viscosity at 210° F. by at least 200 greater than that of the original resin and thereafter adding the resulting suspension to the oleaginous composition.

14. The method of stably dispersing a normally oil insoluble material in an oleaginous composition as claimed in claim 13 wherein the oil insoluble material is heated to a temperature above its melting point and added to the oxygen condensed resin.

15. The composition of claim 1 wherein the dispersed oil insoluble material is a perfluoro compound.

References Cited

UNITED STATES PATENTS

| | | | |
|---|---|---|---|
| 2,427,272 | 9/1947 | Fuller et al. | 252—32.7 |
| 2,625,510 | 1/1953 | Moore | 252—37 |
| 2,744,872 | 5/1956 | Nelson | 252—49.6 |
| 2,753,307 | 7/1956 | Foehr et al. | 252—55 |

DANIEL E. WYMAN, Primary Examiner

I. VAUGHN, Assistant Examiner

U.S. Cl. X.R.

252—25, 49.6, 46.6, 55, 32.7, 16

UNITED STATES PATENT OFFICE
CERTIFICATE OF CORRECTION

Patent No. 3,455,828                             July 15, 1969

Franklin I. L. Lawrence et al.

It is certified that error appears in the above identified patent and that said Letters Patent are hereby corrected as shown below:

Column 1, line 34, "oil-soluble" should read -- oil-insoluble --. Column 3, line 50, "or" should read -- of --. Column 10, TABLE 1, second column, line 8 thereof, "266" should read -- 66 --. Column 12, line 57, "produce" should read -- product --. Column 14, line 58, "imine" should read -- amine --; line 65, "chemically combined sulfur. The product when" should read -- terminated when the product was characterized by a --.

Signed and sealed this 21st day of April 1970.

(SEAL)
Attest:

Edward M. Fletcher, Jr.
Attesting Officer

WILLIAM E. SCHUYLER, JR.
Commissioner of Patents